Jan. 17, 1961 G. E. KELLOGG ET AL 2,968,155
POWER BRAKE BOOSTER UNIT
Filed Aug. 26, 1958 2 Sheets-Sheet 1

INVENTORS.
George E. Kellogg
Robert H. Bauman
BY
D.C. Staley
Attorney

INVENTORS.
George E. Kellogg
Robert H. Bauman
BY
D.C. Staley
Attorney

United States Patent Office 2,968,155
Patented Jan. 17, 1961

2,968,155
POWER BRAKE BOOSTER UNIT

George E. Kellogg, Miamisburg, and Robert H. Bauman, Dayton, Ohio, assignors to General Motors Corporation, Detroit, Mich., a corporation of Delaware Filed Aug. 26, 1958, Ser. No. 757,260

8 Claims. (Cl. 60—54.6)

This invention relates to a vehicle brake booster unit, and more particularly to a power brake booster unit employing a diaphragm for assisting in operation of the vehicle brakes.

The operation of vehicle brakes in the present-day automobile is often accomplished by use of a manual means assisted by a power booster unit. It is advantageous to employ a booster unit with the minimum loss due to friction within the booster unit. The common type of a booster unit employs a piston operating within the booster unit which may be connected to a fluid displacement member in the master cylinder. The piston within the booster unit has an inherent disadvantage of friction between the piston and the walls of the booster unit. This friction could be eliminated by employing a diaphragm within the booster unit whereby the only support means would be a rod or piston extending into the master cylinder for operating as a fluid displacement member.

It is an object of this invention to provide a power wall within the brake booster unit which employs a diaphragm to separate the internal portion of the power unit into two compartments. This power wall has a sole supporting means on its central portion which is integral with the piston extending into the master cylinder.

It is another object of this invention to provide the piston in the master cylinder as the sole supporting means of the power wall within the booster unit and a hollow concentric cylinder portion on the rear end of said piston as the supporting means for a sliding valve within the power booster unit. The sliding valve, the power wall, and the master cylinder piston are all concentrically mounted in relation to each other.

It is a further object of this invention to provide a hollow sliding valve concentrically mounted within the rear end of the sole supporting means for the power wall for receiving the push rod for actuating said valve. The push rod engages the internal portion of the sliding valve at a point forward of the power wall.

It is a further object of this invention to provide freedom for angular movement of the push rod within the hollow portion of the sliding valve. The push rod is actuated by manual means and operates the sliding valve or air valve as well as a vacuum valve which is concentrically mounted within the valve housing which is a component part of the movable power wall.

The objects of this invention are accomplished by constructing a power unit which employs a diaphragm which is firmly connected to the rearward end and outer periphery of the power brake booster unit casing. The inner periphery of the diaphragm is provided with an annular bead which is mounted on the movable power wall. The movable power wall also contains the vacuum valve and air valve which are operated by a push rod directly connected to manual operating means. This valve arrangement is concentrically mounted in the power wall and operates in conjunction with a proportioning reaction device which is also carried in the power wall. This reaction device operates directly through the piston and sole supporting means for the power wall. The piston or fluid displacement member is supported by the master cylinder of the braking device. This master cylinder and the casing of the power brake unit are mounted adjacent to each other and concentrically with each other. The master cylinder is a single unit casting carrying a reservoir positioned above the master cylinder.

The fluid displacement member extends rearward and has a hollow cylindrical portion for receiving the forward end of a mating portion on the slidable air control valve. The sliding air control valve has an opening from the rear extending forward for the greater length of the valve member and receives the push rod which bears against the valve member at a point forward of the power wall.

This structure provides for a power wall employing a diaphragm to permit free axial movement of the power wall. This power wall having as a sole supporting means, the fluid displaced member extends into a master cylinder of the braking system. The sliding air valve is manually controlled by a push rod, and this valve has its sole supporting means within the rearward end of the piston for the master cylinder. The master cylinder piston operates as a fluid displacement member, the sole support means for the power wall, and the supporting and guiding means for the air control valve which is mounted in the power wall.

Further objects and advantages of the present invention will be apparent from the following description, reference being had to the accompanying drawings wherein a preferred embodiment of the present invention is clearly shown.

Figure 1 is a cross-section view of the brake power booster unit directly connected with the master cylinder and piston. The master cylinder is shown in communication with the braking fluid system. The manual connection for operation of the fluid displacement member and booster unit is also shown in reduced scale.

This invention is disclosed on the three views as described in the preceding paragraphs. The disclosure in these views illustrates the mounting of the power wall and the air control valve and the operation thereof. A similar valve is disclosed in the copending application of the same assignee, Serial No. 757,261, filed August 26, 1958. A second copending application of the same assignee further illustrates the operation of the diaphragm and the specific mounting within the casing of the power booster unit. This application is Serial No. 757,259, filed August 26, 1958. These two copending applications may be helpful in giving an overall picture of the power booster unit.

Figure 1:
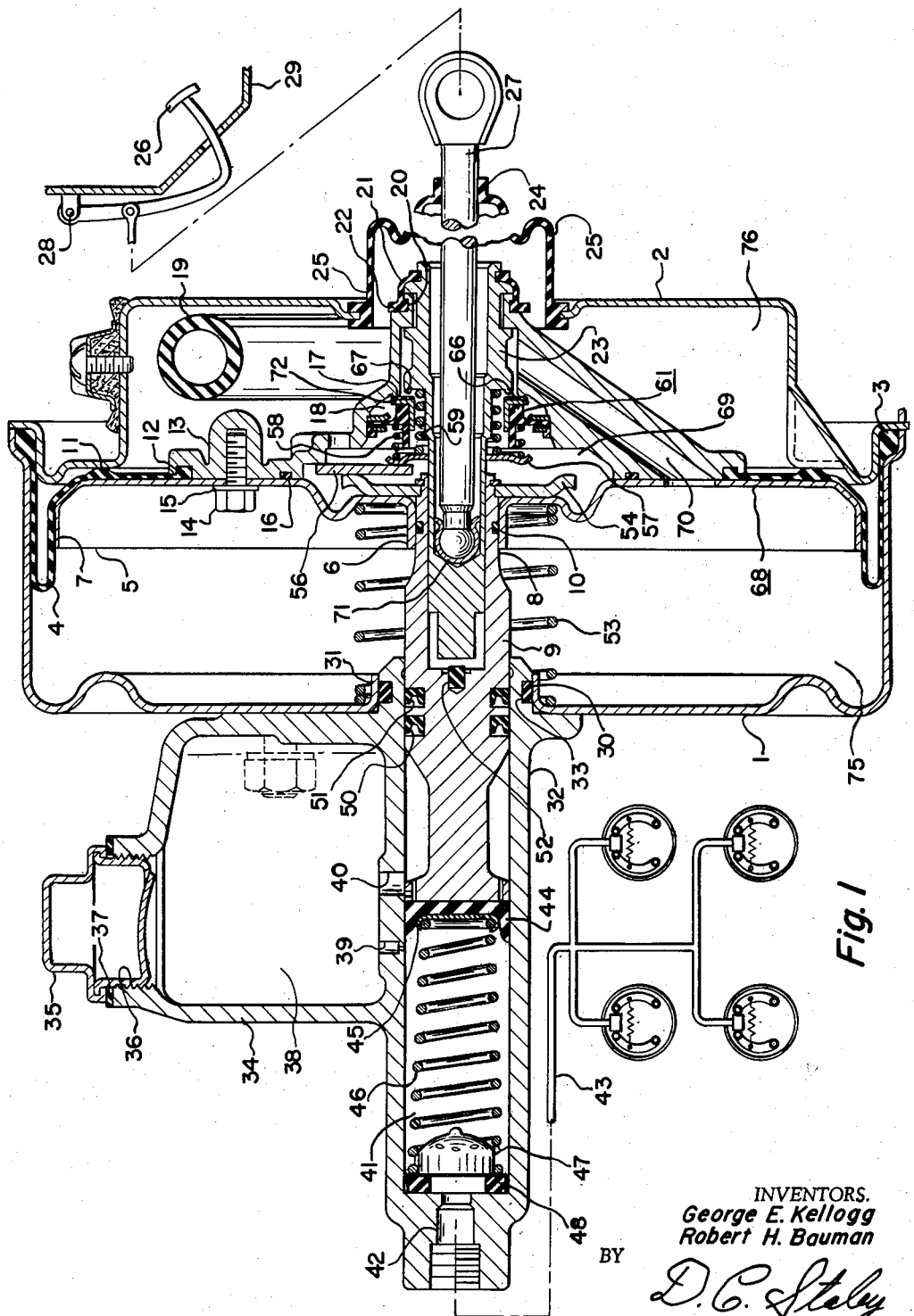

Figure 1 discloses the cross-section view of a power booster unit connected with the hydraulic system for actuating the brakes, and the manual control means for actuating the brakes and the brake power unit. The booster unit is mounted within a casing, comprising of two parts. The forward part 1 is connected to the rearward part 2 by means of a bayonet lock. This locking device is further illustrated in the copending application mentioned above. The lock provides a firm contact on the bead 3 of the diaphragm element. This firm contact seals the diaphragm at its outer periphery between the forward and rearward casing elements. The diaphragm 4 is shown in the retracted position where the diaphragm folds into a U-shaped cross-section where the inner portion of the diaphragm fits around the diaphragm support member 5. You will note that the diaphragm support member 5 does not extend the full length of the inner side of the diaphragm. This shortened portion of the diaphragm support member will permit a shorter casing element 2 for a given forward movement of the power wall than where the support extended the full length of the fold.

The diaphragm support member 5 comprises a pan-shaped sheet metal stamping which extends radially inward to where it has a similar axially extending flange 6 such as the outer flange 7. This inner flange 6 mounts on the rearward portion 8 of the piston 9. An O ring 10 is employed as a seal between the flange 6 and a rear portion of the piston 8.

The diaphragm member 4 extends rearwardly along the outer periphery, and radially inward along the axially rearward portion of the diaphragm support member 5. A bumper 11 comprises a bead formed on the rear portion of the diaphragm and abuts the inner portion of the rear casing 2. This bead is a concentric ring which is an integral part of the diaphragm 4. The diaphragm 4 extends radially inward and fits adjacent to the rear wall of the diaphragm support member 5 to a second concentric bead which is shown having a square cross-section at 12. This square bead 12 is received within the valve housing 13, the valve housing 13 being concentrically connected to the diaphragm support member 5 by means of bolts 14 and washers 15. An additional seal comprising an annular rubber ring 16 is disposed between the valve housing 13 and the diaphragm support member 5 at a point radially inward from the square bead 12 of diaphragm 4.

The valve housing 13 extends radially inward and rearward to enclose a portion of the proportioning reaction device and the vacuum and air valve. The inner portion of the valve housing operates as the vacuum valve. This portion forming the valve 17 is a concentric ring-like shoulder extending forward from the inner portion of the valve housing. The vacuum valve 17 controls the vacuum outlet to the chamber 18 which is enclosed by the valve housing 13. This chamber 18 is directly connected to the inlet conduit 19 which partially encircles the rearward end in the constant pressure chamber. Conduit 19 and the vacuum chamber 18 are connected within the valve housing.

The rearward end of the cylindrical portion of valve housing 13 is provided with an annular depression 20 for receiving a rubber boot 21 having a mating ring portion 22 fitting into the groove of the valve housing 13. This boot operates as a vacuum seal between the valve housing 13 and the sliding air valve 23. The push rod 27 is adapted for receiving the radially inner portion of the boot 25 designated the portion 24. The boot 25 extends radially outward and forward where it joins a rear booster casing 2. The booster casing 2 fits into an annular groove in the boot 25. These two boots provide for the positive sealing between the three adjacent relatively moving parts such as the rear casing member 2, the valve housing 13, and the air valve 23.

The manual lever 26 is shown in a reduced scale for actuating the push rod 27. The lever 26 is pivotally mounted on a support 28 connected to the compartment wall 29 of the vehicle passenger compartment. The lever 26 mechanically operates push rod 27 which is operatively mounted within the air valve 23.

The forward end of the booster unit is directly connected to the master cylinder. The booster unit housing member 1 is a pan-shaped member extending radially inward on its forward end which is mounted adjacent to a radial flange on a master cylinder casing. The inner periphery on the forward end of the power booster casing is connected with an axially extending rearward flange which is mounted on the outer periphery of a mating external cylindrical portion of the master cylinder.

A seal ring 30 is mounted between the axially rearward extending flange 31 of the casing member 1 and the master cylinder 32. This cylindrical portion 32 of the hydraulic master cylinder is provided with an annular groove 33 for receiving the annular sealing ring 30.

The master cylinder 32 comprises a single unitary casting with a reservoir 34. The reservoir 34 extends upward from the master cylinder and has an opening 36 for the filler plug 35. This filler plug threadedly engages the opening 36 and is assembled with a seal 37 between the filler plug 35 and the upper portion of the opening 36.

The reservoir chamber 38 is connected in a conventional manner by two passages 39 and 40 for communication between reservoir 38 and the chamber 41 in the master cylinder. The forward end of the master cylinder 32 is provided with an opening 42 for communication with the hydraulic system 43 to the various wheel cylinders operating the vehicle brakes.

The master cylinder as a part of the fluid system operates in cooperation with the piston 9. This piston fits concentrically within the master cylinder 32. The forward end of the piston 9 is assembled with a seal 44. The seal 44 is held in position by means of the retainer 45 and spring 46. The spring 46 on its forward end engages the cup-shaped member 47. A rubber ring 48 is disposed between the cup-shaped member 47 and the forward end of the master cylinder wall. This cup-shaped member 47 contains a conventional device for retaining fluid in the fluid lines and the hydraulic wheel cylinders.

The piston 9 is provided with two annular grooves about the outer periphery of the middle portion of this member. These grooves receive two sealing rings 50 and 51. These seals operate within the rearward portion of the master cylinder. Within the hollow portion of the piston on the forward end of the opening extending from the rear a bumper 52 is located. This bumper 52 provides for a cushion between the forward end of the sliding valve 23 and the piston 9.

Figure 2:
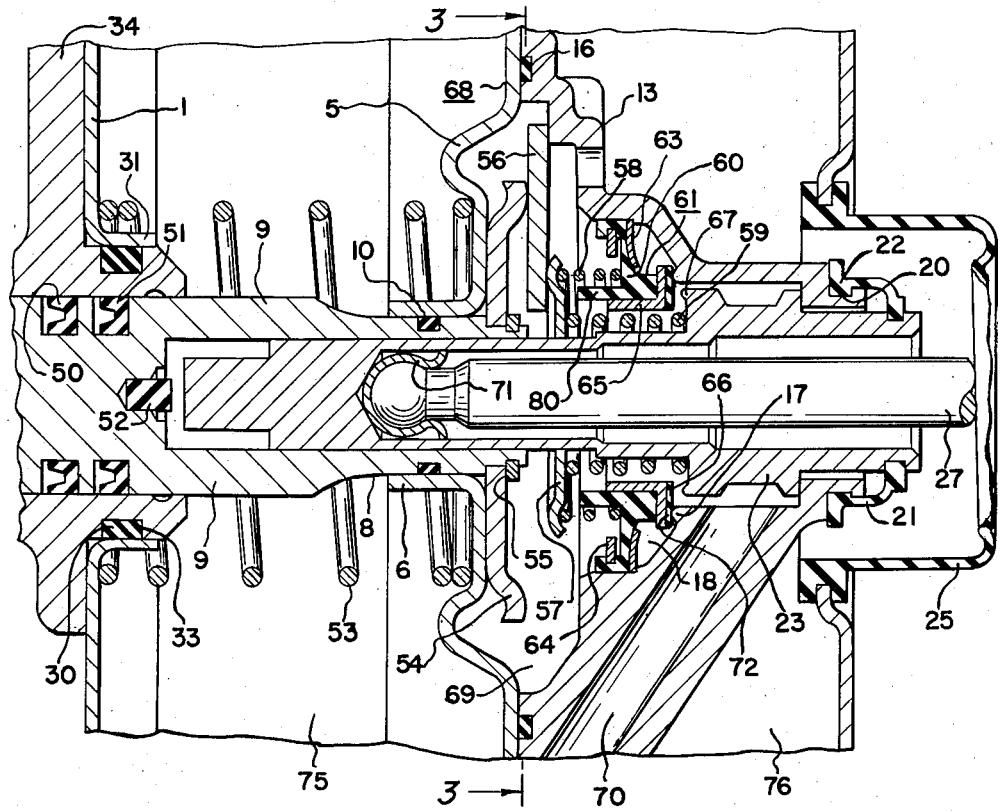
Figure 2 is an enlarged and cross-section view of the rear portion of the piston which operates as the supporting means for the power wall and the air valve. The valve is shown in the retracted position.

Figure 2 discloses an enlarged view of the valve housing and movable wall assembly. The two seals 50 and 51 and bumper 52 are shown more clearly in this view. The spring 53 is operatively placed between the forward wall of the power booster casing 1 and a pan-shaped diaphragm support member 5. This spring forces the power wall to the rearward position where the bead 11 on the diaphragm 4 engages the rearward wall of casing member 2. The forward portion of the power wall is assembled by placing the diaphragm support member 5 around the rearward end of the piston 9. The reaction disc 54 is then placed rearward of the diaphragm support 5. The reaction disc is held in position by means of a snap ring 55 which fits in an angular groove about the outer periphery of the rearward end 8 of piston 9.

Figure 3:
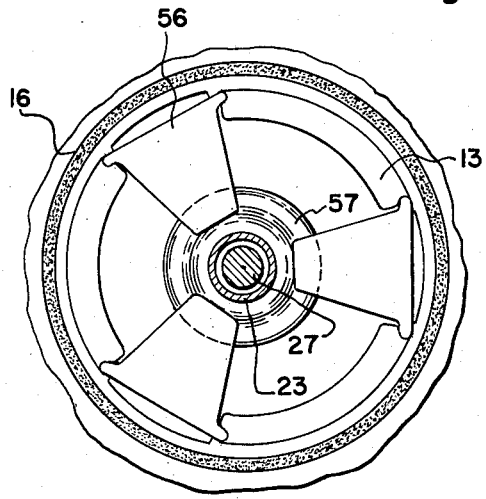
Figure 3 is a cross-section view taken on line 3—3 of Figure 2. This view shows the mounting of the reaction fingers in relation to the reaction plate.

The reaction fingers 56 shown in Figure 3 are of a somewhat T-shaped structure and fit into slots in the valve housing. Reaction fingers 56 are pivotally mounted on the symmetrical portion of the T-shaped structure and bear on their central portion against the reaction disc 54. The radially outer portion of the reaction disc is provided with an annular ridge for the reaction finger 56 to pivot on.

The radially inner portion of the reaction finger engages a reaction plate 57. The reaction plate fits around the outer periphery and forward of a shoulder stop on the central portion of valve member 23. Reaction plate 57 is held in the forward position against the reaction fingers 56 by means of two springs 58 and 59. Both springs 58 and 59 are mounted concentrically with the valve member 23. Spring 58 abuts the resilient portion 60 of the valve seat member 61. The spring of the radially smaller diameter 59 is mounted between the reaction plate 57 and a radial flange portion on the valve member 23. This spring holds the air valve member 23 in a normally open position as shown in Figure 2.

The valve seat member 61 is concentrically mounted within the valve housing 13. The outer periphery of the valve seat member 61 fits within the forward portion and the inner periphery of the valve housing member 13. A seating ring 63 is co-axially disposed on the rearward side of the valve seat member 61. The retainer ring 64 is coaxially mounted within the axial flange on the outer periphery of the valve seat member 61. This retainer ring 64 maintains a constant location of the outer periphery of the valve seat member 61 in relation to the valve housing 13. Connected to this portion of the axially extending flange is a radially inwardly extending resilient flange which, in turn, is connected to a cylindrical portion on the inner periphery of the valve seat member. This radial flange connecting the two portions of the valve seat member 61 provides for axial movement of the cylindrical portion 60 in relation to the axially extending flange of the radial outer portion of the valve seat member 61. A metal portion 65 is bonded to the inner periphery and the rearward portion of the cylindrical portion 60 of the valve seat member 61. This metal member prevents deformation of the cylindrical portion 60 of the valve seat member 61 and also permits the bonding of a valve seat portion 66 and 72. The valve seat portion 72 operates in conjunction with the vacuum valve 17 and the air valve seat 66 with air valve 67. Both these valves are formed by an annular ring portion on their supporting structure. Valve 17 is mounted on the inner periphery of the valve housing and is in fixed relation to the power wall 68. The valve 67 is an annular ring on a radially outer portion of the air valve 23. This valve member 23 moves axially in relation to the vacuum valve 17. The forward movement of the valve member 23 seats the valve portion 67 against the valve seat 66. This closes off the air chamber 69 from the passage 70. Further forward movement of the valve member 23 opens the vacuum chamber 18 to the passage 70 which places the brake power booster in an operative position due to the vacuum created on the forward side of the power wall 68.

The push rod 27 has a spherical head fitting into a seating member 71. Seating member 71 engages the forward end of the opening in the valve member 23. The constant contact between the seating member 71 and the forward end of the opening in the piston member 9 is maintained by the spring 53 and springs 58 and 59.

The power booster unit operates in the following manner: As brake pedal 26 is depressed, the push rod 27 moves forward and the spherical head within the seating member 71 creates a pressure within valve member 23. Valve member 23 moves forward until the valve portion 67 engages the valve seat 66. At this point, the air chamber 69 and the passage 70 are no longer in communication. The spring 59 is compressed creating a force through the reaction fingers to the power wall. Upon further forward movement of the valve member 23, the vacuum valve 17, which is carried by the valve housing 13 begins to open as the valve seat 72 moves axially forward. The forward movement of the valve seat is created by the valve portion 67 of valve member 23. At this point, the vacuum chamber 18, which is directly connected to a vacuum source through conduit 19, is then in communication with the passage 70 which leads to the forward side of the power wall. This connection from the vacuum source to the forward side of the power wall creates a lower pressure on the forward side of the power wall in relation to the atmospheric pressure on the rear side of the power wall.

The valve seat member 61 moves forward to compress the spring 58. Both springs 58 and 59 axially compress against the reaction plate 57. The pressure on plate 57 is transferred to the reaction fingers 56 and then to the reaction disc 54. The actuating force created through the push rod 27 being equaled in opposition to the reaction force created by the fluid displacement member 9 in the hydraulic master cylinder 32 when port 39 is closed by forward movement of piston 9.

In the "hold" position, both the vacuum valve 17 and the air valve 67 are in the closed position. As the brakes are released air valve 67 returns to the open position and the power wall 68 returns to the retracted position by means of spring 53.

You will note that during the operation of the brake power booster unit that the sole supporting means of the power wall 68 is provided by a fluid displacement member or master piston 9, the master piston 9 having a sufficient bearing portion of a reasonably close tolerance within the master cylinder 32. The friction created within the master cylinder by the movement of the piston is a normal drag created in any conventional master cylinder. There is, however, a minimum of friction created in the booster unit as the booster unit moves forward by the action of the differential pressure within the vacuum compartment 75 and the air pressure compartment 76. The sliding air valve 23 is also supported solely by the master piston 9. The inner periphery of the rearward portion of piston 9 has a sufficiently close tolerance to provide for accurate alignment of the valve member 23 within the rear portion of piston 9. The movement of the valve member 23 is an axial movement with sufficient alignment for operation of the valve assembly.

The forward end of the internal portion of the valve member 23 is also provided with a surface for receiving a seating member 71. Seating member 71 containing a spherical ball of the push rod 27.

The point of pressure within the valve member 23 is forward of the pressure wall 68. The piston 9 is provided with bearing support over considerable length of the piston within the master cylinder. The manual pressure within the valve member 23 being actuated in the forward portion and at a point beyond the power wall eliminates any possibility of misalignment due to slight angularity of push rod 27.

This type of support means provides for a low loss of friction within the power unit as well as maintaining a good alignment within the moving parts of the power booster unit.

While the embodiment of the present invention as herein disclosed constitutes a preferred form, it is to be understood that other forms might be adopted.

What is claimed is as follows:

1. In a brake booster unit comprising in combination, a brake booster housing, a master cylinder mounted adjacent to and concentric with said booster unit housing, a movable wall employing a flexible diaphragm and concentrically mounted within said booster unit housing and centrally and solely supported by the master piston extending into said master cylinder, a vacuum valve means and an air valve means mounted within said movable wall and operated by a manual control means, said air valve slidably mounted within a hollow rearward portion of said master piston, a portion of said manual control means extending into a hollow portion of the rearward end of said air valve member and contacting said air valve member at a point forward of said movable wall thereby providing a master piston as the sole supporting means for said movable wall and said sliding air valve.

2. A power brake unit comprising in combination, a power unit housing, a master cylinder mounted forward of and concentric with said power unit housing, a movable wall mounted concentrically within said booster unit and operating in conjunction with a flexible diaphragm, said movable wall centrally mounted and solely supported by a master piston extending into said master cylinder, said power wall comprising a valve housing member rigidly mounted as a part of said power wall, a vacuum valve forming an annular ring portion within said valve housing, a movable air vacuum valve seat member mounted on a resilient member, said valve member concentrically mounted within said valve housing, an air valve concentrically mounted within a hollow rear portion of said master piston and adapted for axial movement within said rearward portion of said master piston, said valve member provided with an annular ring for engaging said resilient valve seat member, manual means for operating said air valve member, said manual means including a push rod actuating said valve member in a hollow cylindrical portion extending from the rearward end of said valve member to a point forward of said movable wall thereby providing manual control means for actuating said air and said vacuum valves by contacting the inner portions of said valve member at a point forward of said power wall.

3. A fluid motor comprising in combination, a fluid motor casing, a master cylinder mounted adjacent to said fluid motor casing, a movable wall within said fluid motor centrally and solely mounted by means of a master piston operating within said master cylinder, said rearward end of said master piston containing a hollow cylindrical portion for receiving the forward end of an air valve member, said air valve member operating in conjunction with a vacuum valve member against concentric valve seats, said air valve member operated by a manual means including a push rod extending through a hollow cylindrical portion from the rearward end of said valve member to a point forward of said movable wall for providing the actuation of said valves, said master piston thereby functioning as a fluid displacement member, a power wall supporting means, a valve member supporting and guiding means within said fluid motor.

4. A brake power unit comprising in combination, a power unit casing, a master cylinder mounted adjacent to and concentric with said power casing, a movable wall including a flexible diaphragm dividing the internal portion of said power unit casing into two compartments, the forward compartment being the vacuum chamber and the rearward compartment being the air chamber, said movable wall centrally supported by a master piston operating as a fluid displacement member in said master cylinder, said master piston provided with a cylindrical opening in the rearward end for receiving the forward end of an air valve, said air valve mounted concentrically within a vacuum valve, said vacuum valve concentrically mounted as a part of said movable wall, a resilient member mounted within said movable wall and provided with valve seats operating in cooperation with said vacuum and said air valves for controlling said vacuum chamber, said air valve member adapted for receiving a push rod connected to a manual control means, said push rod actuating said air valve control member at a point forward of said movable wall thereby providing a power brake unit of minimum frictional loss within the booster unit.

5. A power brake unit comprising in combination, a brake unit casing, a master cylinder mounted adjacent to and coaxially with said booster unit, a power wall including a diaphragm operating within said booster unit coaxially mounted and centrally supported by a piston operating within said master cylinder, a valve housing being a part of said power wall and connected to the inner periphery of said diaphragm and enclosing a vacuum valve means, and air valve means and said vacuum valve means for operating said power unit, said air valve means coaxially mounted within the rearward end of said master piston and operated by a push rod adopted for operation by a manual control means, said push rod actuating said air valve at a point internally of said air valve member forward of said valve housing member.

6. In a power brake unit comprising in combination, a power unit housing, a master cylinder mounted adjacent to and concentric with said power unit housing, a movable wall employing a flexible diaphragm and concentrically mounted within said power unit housing and centrally and solely supported by a master piston extending into said master cylinder, a vacuum valve and an air valve mounted concentrically within said movable wall and operated by a manual control means, said air valve slidably mounted within a hollow rearward portion of said master piston, said manual control means including a push rod extending into a hollow portion of the rearward end of said air valve member and pivotly contacting said air valve member at a point forward of said movable wall to prevent cocking of said master piston in said master cylinder, said hollow portion of said air valve being of sufficient diameter to permit slight angularity of said air rod with said air valve, said movable wall comprising a diaphragm supporting member concentrically mounted on the rearward end of said master piston, a valve housing connected to said diaphragm support member and having an annular ringed portion formed within said valve housing member and operating as said vacuum valve, a valve seat member mounted concentrically within said valve housing member having a flexible radial flange to permit axial movement of the seating portion on said valve seat member, said valve seat cooperatively operating with said vacuum valve member and said air valve member upon actuation by said manual means.

7. In a power brake unit comprising in combination, a brake booster housing, a master cylinder mounted adjacent to and concentric with said booster unit housing, a movable wall employing a flexible diaphragm and concentrically mounted within said power brake unit housing and centrally and solely supported by a master piston extending into said master cylinder, control valve means mounted within said movable wall and operated by manual means, said movable wall comprising a diaphragm supporting member mounted on the rearward portion of said master piston, a valve housing mounted on said diaphragm support member and concentrically retaining the radially inner portion of said diaphragm, an annular ridge concentrically formed on the inner periphery of said valve housing and operating as a vacuum valve, a sliding air valve mounted within a hollow rearward portion of said master piston, said air valve having an annular ridge portion formed thereon and operating concentrically within said valve housing, said sliding air valve having a hollow portion extending from the rear end of said sliding air valve for receiving a push rod connected to said manual control means and actuating said sliding air valve through a pivoting contact at a point forward of said movable wall, a valve seat member for cooperative engagement with said air valve and said vacuum valve and having a flexible radial wall to provide axial movement of the valve seat portion in relation to said valve housing while the mounting portion of said valve seat remains stationary in relation to said valve housing when sliding air valve is actuated by said manual control means.

8. In a power brake unit comprising in combination a power brake housing, a master cylinder mounted adjacent to and concentric with said power unit housing, a movable wall employing a flexible diaphragm and concentrically mounted within said power unit housing and centrally and solely supported by the master piston extending into said master cylinder, said master piston adapted for displacement of fluid and pressurizing fluid within a fluid system for actuating vehicle brakes, a vacuum valve and an air valve mounted within said movable wall and operated by a manual control means, said movable wall comprising a diaphragm support member centrally mounted on the rearward end of said master piston, a valve housing mounted on said diaphragm support member, an annular ridge formed on the inner periphery of said valve housing and operating as a vacuum valve, said air valve concentrically mounted within said valve housing and having a concentrically mounted ridge operating as the air valve, a valve seat member mounted within the inner periphery of said valve housing and having a flexible radial wall to permit axial movement of valve seat portion operating in cooperation with said vacuum valve and said air valve, said sliding air valve having a hollow rearward portion for receiving a portion of said manual control means and contacting said air valve member at a point forward of said movable wall to provide favorable aligning structure for said sliding air valve and said master piston.

References Cited in the file of this patent

UNITED STATES PATENTS

| | | |
|---|---|---|
| 1,687,047 | Trail | Oct. 9, 1928 |
| 1,876,882 | Eaton | Sept. 13, 1932 |
| 2,098,665 | Kliesrath | Nov. 9, 1937 |
| 2,644,305 | Price et al. | July 7, 1953 |
| 2,763,989 | Ayers | Sept. 25, 1956 |
| 2,807,239 | Grant | Sept. 24, 1957 |
| 2,826,041 | Rike | Mar. 11, 1958 |
| 2,826,042 | Rike et al. | Mar. 11, 1958 |
| 2,832,316 | Ingres | Apr. 29, 1958 |
| 2,862,365 | Ingres et al. | Dec. 2, 1958 |

FOREIGN PATENTS

| | | |
|---|---|---|
| 747,273 | France | Mar. 28, 1933 |